United States Patent [19]

Henk

[11] 4,400,449
[45] Aug. 23, 1983

[54] LEAD SALT ELECTRIC STORAGE BATTERY

[75] Inventor: Peter O. Henk, Cedervej 14, Olstykke, Denmark, DK-3650

[73] Assignees: Peter O. Henk, Olstykke; Peter Axel Fischer, Copenhagen, both of Denmark

[21] Appl. No.: 296,265

[22] PCT Filed: Jan. 9, 1981

[86] PCT No.: PCT/DK81/00002
§ 371 Date: Aug. 21, 1981
§ 102(e) Date: Aug. 21, 1981

[87] PCT Pub. No.: WO81/02075
PCT Pub. Date: Jul. 23, 1981

[30] Foreign Application Priority Data
Jan. 10, 1980 [DK] Denmark ............................... 117/80

[51] Int. Cl.$^3$ .......................................... H01M 10/06
[52] U.S. Cl. ....................................... 429/59; 429/199; 429/225; 429/198
[58] Field of Search ................... 429/59, 19, 105, 204, 429/198, 225, 228, 46, 188, 212

[56] References Cited
U.S. PATENT DOCUMENTS

| | | | |
|---|---|---|---|
| 3,433,673 | 3/1969 | Duddy | 429/212 |
| 3,481,790 | 12/1969 | Duddy | 429/119 |
| 3,540,933 | 11/1970 | Boeke | 429/19 |
| 3,813,301 | 5/1974 | Carr | 429/50 |
| 3,904,433 | 9/1975 | Frazier | 429/94 |
| 4,001,037 | 1/1977 | Beck | 429/188 |
| 4,092,463 | 5/1978 | Wurmb et al. | 429/105 |
| 4,096,318 | 6/1978 | Wurmb et al. | 429/199 |
| 4,331,744 | 5/1982 | Henk et al. | 429/59 |

*Primary Examiner*—Anthony Skapars
*Attorney, Agent, or Firm*—Watson, Cole, Grindle & Watson

[57] ABSTRACT

In a one-cell or multi-cell lead salt electric storage battery with electrodes of first order, the anode of the cell or each cell has an active anode body (4) consisting of graphite fibers in textile structure. This active anode body is connected with an electrolyte-impervious, electrically conductive cell closure (1) consisting of moulded artificial resin with moulded-in, uniformly distributed short graphite fibers. The connection between the active anode body and the cell closure is established either by gluing with an artificial resin glue (5) with mixed-in short graphite fibers, or by embedding fibers at the surface of the active anode body in the artificial resin of the cell closure (1) by temporary softening of the surface of the artificial resin by heat or by the application of a volatile solvent. The electrolyte consists of lead silicofluoride (PbSiF$_6$) with or without addition of lead methane sulfonate (Pb(CH$_3$SO$_3$)$_2$) dissolved in water. The graphite fibers used for the anode body and the artificial resins with admixed short graphite fibers are such as are capable of withstanding a gas development test specified in the description. Important examples are pitch-based graphite fibers having a solid matter density above 1.8 g/cm$^3$. The cell or each cell of the battery may be permanently hermetically closed because no gas is developed within the battery at any time.

11 Claims, 5 Drawing Figures

LEAD SALT ELECTRIC STORAGE BATTERY

CROSS REFERENCE TO RELATED APPLICATIONS

This invention relates to the invention described in copending U.S. application Ser. No. 190,884, filed Mar. 12, 1980, now U.S. Pat. No. 4,331,744.

BACKGROUND OF THE INVENTION

1. Field of the Invention

The invention relates to a lead salt electric storage battery with electrodes of first order, i.e., a battery in which the active materials are deposited as coatings on the electrodes during charging and are again dissolved in the electrolyte during discharging. Such batteries are known per se.

2. The Prior Art

Electric batteries with electrodes of first order and electrolytes other than lead salts are also known in a great many varieties, and many of these have satisfactory properties for various uses. However, the invention is directed specifically to the problems of lead salt batteries, which have the potential advantage of providing a relatively inexpensive medium for the reversible storage of electric enregy for general purposes.

Lead salt electric storage batteries of the type considered are known from the Western German published applications Nos. 2,451,017 and 2,532,512. These batteries contain as electrolyte aqueous solutions of lead salts of perchloric acid, tetrafluoro boric acid, hexafluoro silicic acid and/or amido sulfonic acid. From the electrolyte lead dioxide and metallic lead are deposited during charging on the anode and the cathode respectively in the form of coatings, from which they are again dissolved during discharging. By the anode is to be understood, throughout this specification, the electrode which forms the positive pole during discharge. In the known batteries considered the anode consists of a porous, graphite-filled artificial resin having a pore volume of 20–70% and containing 50–80% graphite by weight.

SUMMARY OF THE INVENTION

It is the object of the invention to construct a lead salt electric battery with electrodes of first order and with an anode body comprising graphite in such a manner as to completely avoid the development of gas, even transitionally, within the cell or each cell of the battery, while at the same time obtaining compactness of structure, a high mechanical, electrical and chemical stability and a high amp-hours capacity in relation to volume and weight.

According to the invention, a lead salt battery of the type described is characterized by the combination of the following features:

(a) the active anode body consists of graphite fibres in textile structure, (b) the active anode body is connected with an electrolyte-impervious, electrically conductive cell closure consisting of moulded artificial resin with moulded-in, uniformly distributed short graphite fibers, (c) the connection between the active anode body and the cell closure is established either by gluing with an artificial resin glue with mixed-in short graphite fibers, or by embedding fibers at the surface of the active anode body in the artificial resin of the cell closure by temporary softening of the surface of the artificial resin by heat or by the application of a volatile solvent, (d) the electrolyte consists of lead silicofluoride ($PbSiF_6$) with or without the addition of lead methane sulfonate ($Pb(CH_3SO_3)_2$) dissolved in water, (e) the graphite fibers mentioned sub(a), (b) and (c) and the artificial resin materials with moulded-in short graphite fibers are such as are capable of withstanding the gas development test defined in the description.

By textile structure is to be understood, throughout this specification, not only a woven or otherwise worked-up textile structure, but also a non-woven textile structure.

The gas development test mentioned sub (e) is carried out as follows:

GAS DEVELOPMENT TEST

A sample of the textile material of the anode body and a strip of lead are immersed in an acid (e.g. pH=0.2) aqueous solution of lead silicofluoride and are connected to a source of electric current, the sample to the positive, and the strip of lead to the negative terminal. Hereby the textile material is coated with lead dioxide. The process is terminated upon deposition of a thin layer so that the open textile structure is still clearly visible.

The sample is now inserted into a test tube from polystyrene filled with the same liquid as above, and the test tube is closed by a polyethylene stopper in such a manner that no air is admitted to the test tube. This is now stored in inverted position, and it is observed whether gas development takes place. This will be visible as gas bubbles on the sample, and if larger bubbles are formed and disengage themselves from the sample, these will collect at the inverted bottom of the test tube. If the slightest trace of gas development is observed within four weeks, the material is unfit.

The graphite fibers to be used in the cell closure and in the glue are tested in the same manner. As samples, mats of the fibers may be used.

The artificial resin of the cell closure is tested in the form of a strip of the material with moulded-in graphite fibers which have been tested beforehand.

The glue is likewise tested upon mixing with graphite fibers that have been tested beforehand. A suitable sample may, e.g., be made by applying a layer of the glue to an aluminum plate which is then etched away by means of caustic soda.

In the systematic testing of groups of graphite materials it has been found to be a general rule that the gas development decreases with increasing density and/or graphitizing temperature, so that by the running of parallel tests it is relatively easy and speedy to select graphite materials which are suitable to be used for active anode material, for cell closure, and for conductive glue in a storage battery according to the invention.

It has been found that with the above-mentioned combination of construction materials, constructional build-up and electrolyte, development of gas in the cell is completely avoided, and a high chemical stability is achieved. An important factor in achieving this result is that the only electrically conducting material to which the electrolyte has access on the anode side of the cell is graphite, which is capable of withstanding the gas development test described.

A graphite material with graphite fibres in textile structure distinguishes itself by having a great pore volume, e.g., about 85%, and the textile structure provides a particularly great pore surface as related to the pore volume, this surface consists of pure carbon in graphite form as contrasted to the combined carbon and artificial resin surface of the anode in the known lead salt batteries referred to above. This contributes to obtaining a high amp-hours capacity for a given volume and a given weight of a battery cell. In spite of the great pore volume such a graphite material has a satisfactory mechanical strength. Graphite materials with graphite fibers in textile structure are available on the market and are, e.g., used as a reinforcement for artificial resins. An example of a suitable graphite material pitch-based graphite fiber is the product sold under the trade name THORNEL by UNION CARBIDE CORPORATION. It is available in different types distinguished, e.g., in respect of the solid matter density of the fibers. This varies between 1.7 and 2.1 g/cm$^3$. A material marketed under the denomination THORNEL type P fabric grade VCB-45 has been used for the construction of batteries according to the invention with good results. This material has been made by graphitizing pitch based fibers and has a solid matter density of 2.0 g/cm$^3$. It may be possible to develop other graphite materials specially adapted for use as an anode material provided that the materials are capable of withstanding the GAS DEVELOPMENT TEST described. According to investigations performed this condition is fulfilled for most available graphite materials, and particularly for pitch-based graphite fibers, having a solid matter density above 1.8 g/cm$^3$. Pitch-based graphite fibers are described in many places in the literature. As an example, reference is made to U.S. Pat. No. 3,976,729. Advantageously, the pore volume of the graphite material amounts to about 40–70% of the total electrolyte volume.

In copending U.S. application Ser. No. 190,884, filed Mar. 12, 1980, now U.S. Pat. No. 4,331,744, the same general build-up of the anode is disclosed, but the only graphite fiber materials disclosed as fit for use in the various elements of the anode are such as have been graphitized at a temperature of at least 2500° C. and the only specific materials disclosed are the SIGRATEX products of Sigri Elektrographit GmbH, particularly SIGRATEX GDS 8-30, which products are all acrylic textile based. Thus, according to the present invention, the available range of graphite fiber materials has been considerably widened, and a universal criterion for the selection of such materials has been established, and furthermore, new and useful specific examples of suitable graphite materials have been indicated.

The anode body may, if necessary, consist of more than one layer of the graphite material with graphite fibers in textile structure. For example, the above-mentioned commercial product THORNEL type "P" fabric grade VCB-45 is available in a layer thickness of 0.7 mm and when using this material it has been found suitable to employ more than one, e.g., four layers of this graphite material in a battery according to the invention. When two or more layers are used, these may suitably be connected with each other by sewing, preferably with graphite yarn and/or polyethylene or polypropylene yarn. Thereby a very intimate electrical connection is obtained between the various layers.

As a further possibility a plurality of graphite material layers may be stitched together before the graphitizing so that the sewing yarn is graphitized together with the layers, or by special weaving methods a material may be produced which consists of a plurality of inter-woven layers which are then graphitized as a whole. It may also be possible to use a pile fabric.

When a plurality of layers of graphite material is used, an alternative method of interconnecting these is to glue them together spot-wise by means of an electrically-conducting glue or adhesive of the same type as specified above. This is a simple method, but it will result in some reduction of the capacity and some increase of the contact resistance between the various layers.

Examples of artificial resins capable of withstanding the GAS DEVELOPMENT TEST and suitable for the moulding of the cell closure are polyethylene, polypropylene or polystyrene, with which short graphite fibers are admixed before the moulding. The graphite fibers are referred to above as short, but ordinarily also could be described as "short-cut", and one way of producing such graphite fibers is to crush a graphitized fiber material, such as that used for the anode body. It is advantageous, however, that the particles thereby produced should still have an elongated fibrous shape, because this contributes to increasing the conductivity of the cell closure. The graphite content may, e.g., amount to about 30%. For the graphite fibers also the trade products THORNEL MAT VDM and VME may be used.

For the purposes of the invention it is not essential that the element referred to as cell closure should in itself have a sufficient mechanical strength for structural purposes. Its function is to close the cell chemically on the anode side and it could fulfil this function even if it were in the form of an electrolyte-impervious film or coating on a plate of higher mechanical strength.

Examples of artificial resin glues or adhesives capable of withstanding the GAS DEVELOPMENT TEST and suitable for connecting the active anode body with the cell closure or for gluing a plurality of layers of graphite material together to form the anode body are polyisobutylene solution and polystyrene solution, with which graphite fibers are admixed as above mentioned. The gluing may take place over the whole area of the anode, but it is important that the glue does not to a substantial extent penetrate into the graphitized material because the pore volume would thereby be reduced.

In the alternative method of uniting the anode body and the cell closure by embedding fibers at the surface of the active anode body in the artificial resin of the cell closure, the temporary softening of the surface of the artificial resin may be performed by applying a volatile solvent, such as chloroform, to the surface of the cell closure, whereby the artificial resin material of the cell closure is superficially dissolved, whereafter the anode body is pressed against the cell closure, e.g. by weight-loading, so that the fibers at the surface of the anode body may penetrate into the softened artificial resin. When the solvent has evaporated, the artificial resin again becomes solid and thereby firmly holds the fibers of the textile material, while at the same time an ideal electric connection is established between the fibers of the anode body and the graphite fibers in the artificial resin material.

An alternative method which has substantially the same result is to weld the anode body to the graphite-containing artificial resin material under the application of heat which wholly or partly melts or fuses the surface of the artificial resin material.

The anode body may advantageously be covered towards the electrolyte by a liquid-permeable supporting diaphragm or separator consisting of a non-gas developing artificial resin material preferably in split fiber form. A suitable material is that sold under the name of polypropylene paper. The separator serves to support the anode material and to prevent any graphite particles split off from the anode body from penetrating into the electrolyte. The diaphragm may be connected to the anode body by sewing with a non-gas developing yarn and the same sewing may serve to connect a plurality of layers of the anode body where such are used. In that case, however, the sewing yarn must not consist of or contain graphite.

Between the cathode and the supporting diaphragm, spacers of insulating, non-gas developing materials may suitably be arranged. Thereby a mechanically strong build-up of the battery cell and a permanent dimensional stability are obtained. The spacers may also be passed through the active anode body and secured to the cell closure and they may be tubular and glued to the cell closure around holes of the latter so that they may be used for the passage of tightening bolts.

In the known lead salt batteries with electrodes of first order it is customary to arrange the electrodes in vertical position and to circulate the electrolyte along the electrodes by means of special pumping devices. These increase the weight of the battery, consume energy and detract from the reliability of the battery, because they are vulnerable and complicated devices.

In contradistinction thereto, in accordance with a preferred embodiment of the invention, the cell or each cell of the battery is permanently hermetically closed and, at least during charging, is disposed with the electrodes in horizontal position and with the anode at the top. This arrangement is possible because the development of gas in the battery cell has been completely avoided, and owing to the horizontal arrangement of the electrodes the necessary movement of the electrolyte may take place by diffusion so that no pumping is required. By placing the cathode at the bottom of the cell during charging, the danger of the formation of dendrites during charging with consequent danger of short-circuit is prevented.

The material or materials used for the cathode, on which metallic lead is deposited during charging of the battery, are not subject to any critical conditions provided only that it is electrically conductive and not prohibitively heavy. In an advantageous embodiment, the cathode consists of a plane plate or cap from the same material as that used for the cell closure. It is proposed, according to the invention, to provide the side of the cathode facing the electrolyte with a thin layer of a graphite spray followed by light polishing. This leaves the cathode with a smooth electrically conductive surface, on which the metallic lead is deposited during charging as a fine-grained almost smooth coating. Hereby the tendency of the lead to form dendrites is additionally suppressed to such a degree that it becomes possible to build battery cells with narrow cathode spaces—down to a spacing of 1.2 mm between the cathode and the supporting diaphragm—which could not be achieved without the graphite spray without involving a risk of short-circuiting. When the cathode space is made narrower, the internal resistance of the battery cells is reduced so that the cells can be discharged at higher current values. An example of a graphite spray that may be used is the product sold under the trade mark GRAPHIT 33 by Kontakt Chemie.

The hermetically closed cells can be filled with the electrolyte by injection through a hole which is then closed by a stopper. If necessary, each individual cell may be provided with an expansion chamber or an expansible wall. Where a number of cells are surrounded by a common wall, this may, e.g., be constructed in the form of a bellows.

In the case of a multi-cell battery, the cells of these may suitably be arranged in the form of a column having bipolar electrodes, the graphite-containing cell closure forming the cathode of the cell next above. A cathode exactly corresponding to the cell closure of the anode, but without any anode body attached thereto may then form the bottom of the stack and since this, like the cell closure, is electrically conducting, external conductors may be directly connected to these elements. Various examples of the connection of external conductors to the end element of a battery will be described in the following.

A multi-cell battery may also be built up by stacking individual cells or twin cells on top of one another with expansion spaces between successive cells or twin cells. This may be obtained by providing the individual cells or twin cells with axially protruding collar portions engaging one another. The electrical connection from cell to cell may, e.g., be obtained by means of conductive coatings extending beyond the engaging surfaces of the collar portions, or by means of resilient electrical conductors mounted in the expansion spaces. The cells may be clamped together by means of bolts extending through the previously mentioned tubular spacers between the cathode and the cell closure.

The use of lead silicofluoride ($PbSiF_6$) as an electrolyte is known per se, but not in combination with the structural arrangement of a cell as above described. As mentioned, lead methane sulfonate ($Pb(CH_3SO_3)_2$) may be used as an alternative to lead silicofluoride, though the capacity will thereby be somewhat reduced. The best results are obtained by using a mixture of lead silicofluoride and lead methane sulfonate in water. By adding lead methane sulfonate to lead silicofluoride an increase of the conductivity of the electrolyte and a decrease of its density are observed. The advantage obtained by the use of lead methane sulfonate occurs already at a relatively low proportion of this material and increases with this proportion up to a certain limit. According to the tests that have been run optimum results are obtained by using an aqueous solution which is about 1.8 molar in respect of lead silicofluoride and about 1.2 molar in respect of lead methane sulfonate. Moreover, the electrolyte may advantageously contain an excess, such as 0.8 molar, of the corresponding acids. In U.S. Pat. No. 4,331,744 only a small excess of acids, such as 0.15 has been disclosed, but it has now been found that still better results are obtained by increasing the excess of acids up to the approximate value mentioned above, or even higher.

DESCRIPTION OF THE DRAWINGS

The invention will now be described in further detail with reference to some examples illustrated in the drawing, in which.

DETAIL DESCRIPTION OF THE INVENTION

EXAMPLE 1

Figure 1:
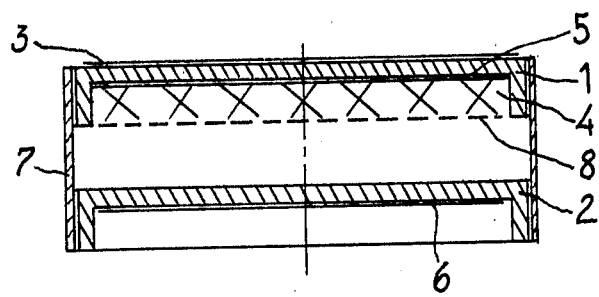
FIG. 1 shows diagrammatically a section through a one-cell battery representing a first and a second example.

One-cell battery, FIG. 1.

Two elements are made by moulding under heat and pressure from a mixture of one part by weight of polyethylene and two parts by weight of short-cut, e.g., crushed graphite fibers. The two elements, which each constitutes a circular plate with a thickness of 0.4 mm and a diameter of 50 mm with a protruding collar portion, are referred to as anode cap 1 and cathode cap 2, respectively. The anode cap 1 is electrolytically copper-plated on its outer face to form a thin layer 3, while an anode body 4 consisting of a graphite material with graphite fibers in textile structure is glued to the inner face of the anode cap 1 over the whole of its area by means of an electrically conducting glue 5 consisting of polyisobutylene and short-cut graphite fibers. As graphite material, the previously mentioned commercial product THORNEL type "P" fabric grade VCB-45 may be used. The anode body has a thickness of 2.8 mm and a pore volume of 85%. The cathode cap 2 is electrolytically copper-plated on its outer face to form a layer 6. A piece of liquid-permeable polypropylene paper 8 is gluded to a thin-walled polyvinylchloride ring 7 so as to extend smoothly and in a stretched state across the cross-sectional area of the ring 7. The anode cap 1 is introduced into the ring 7 on one side of the polypropylene paper 8 so as to bring the anode body 4 into contact with the polypropylene paper 8, whereafter the cap 1 is fixed to the ring 7 by gluing. On the other side of the polypropylene paper the cathode cap 2 is introduced into the ring 7 and fixed by gluing in a position such that the free distance from the polypropylene paper 8 to the cap 2 is 2 mm.

A hole is bored in the side of the ring 7, the electrolyte is injected and the hole is closed by means of a silicon rubber stopper. The electrolyte is an aqueous solution which is 3-molar in respect of lead silicofluoride and which additionally contains an excess, e.g., 0.8 molar, of the corresponding acid.

With such a cell the following test results have been obtained:

By charging with 0.5 A the cell takes up 0.69 Ah. By discharging with 0.35 A it delivers 0.67 Ah in the course of 115 minutes, while at the same time the pole voltage drops from 1.8 V to 1.4 V. The average voltage during discharge is 1.66 V and the specific energy content is 48 Wh/kg.

EXAMPLE 2

One-cell battery, FIG. 1.

The build-up is the same as in example 1, however, the electrolyte is in this case an aqueous solution which is 1.8-molar in respect of lead silicofluoride and 1.2-molar in respect of lead methane sulfonate. Moreover, there is an excess of the corresponding acids corresponding to 0.8-molar.

The following test results have been obtained:

By charging with 0.5 A the cell takes up 0.69 Ah. By discharging with 0.35 A it delivers 0.67 Ah in the course of 115 minutes, while at the same time the pole voltage drops from 1.8 V to 1.4 V. The average voltage during discharge is 1.70 V and the specific energy content is 51 Wh/kg.

EXAMPLE 3

One-cell battery, FIG. 1.

The build-up is the same as in example 1, however, the electrolyte is in this case an aqueous solution which is 3.7-molar in respect of lead silicofluoride and contains no lead methane sulfonate. Moreover, there is an excess of the corresponding acid amounting to 0.4-molar.

The following test results have been obtained:

By charging with 0.5 A the cell takes up 0.86 Ah. By discharging with 0.40 A it delivers 0.82 Ah in the course of 123 minutes, while at the same time the pole voltage drops from 1.85 V to 1.4 V. The average voltage during discharge is 1.75 V and the specific energy content is 55 Wh/kg.

EXAMPLE 4

Figure 2:
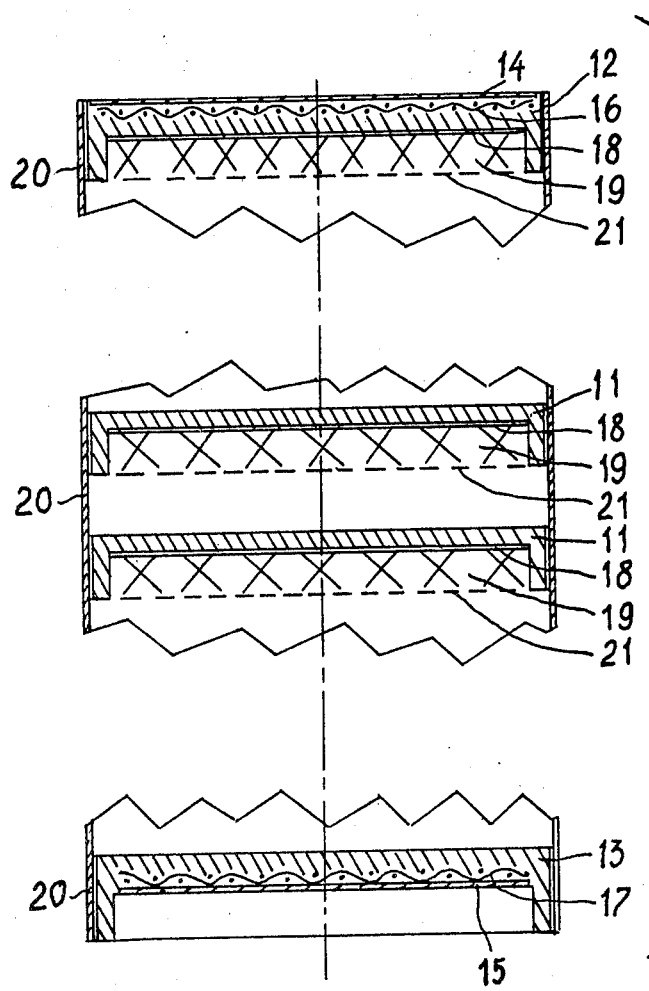
FIG. 2 shows a broken longitudinal section through a seven-cell battery representing a third example.

Seven-cell battery, FIG. 2.

Six identical caps 11 are made by moulding under heat and pressure from 11 parts by weight of polystyrene and 10 parts by weight of crushed graphite fibers. The caps have a thickness of 0.5 mm and a diameter of 150 mm and are constructed with a protruding collar portion. Moreover, a top cap 12 and a bottom cap 13 are produced, each having a thickness of 1 mm. Tin-plated steel plates 14 and 15, respectively, having a thickness of 0.25 mm, and to which tin-plated steel wire nets 16 and 17, respectively, are attached by spot soldering, are pressed into the cap 12 and the bottom cap 13, respectively. An anode body 19 having a thickness of 2.8 mm and consisting of a graphite material with graphite fibers in textile structure and having a pore volume of 85% is fixed to each of the caps 11 and 12 in an interface layer 18 by means of chloroform vapour. The caps are introduced into and glued to a thin-walled polyvinylchloride tube 20 in the following succession starting from the bottom: 13, 11, ..., 11, 12. Immediately below each anode body 19 a piece of liquid-permeable polypropylene paper 21 is mounted at a distance of 2.5 mm from the cap 13, 11, ..., 11 next below by means of 2.5 mm high spacing rings distributed over the cross-sectional area.

Electrolyte is injected through holes bored in the wall of the tube 20, and the holes are then closed by means of silicon rubber stoppers. The electrolyte is an aqueous solution which is 1.8-molar in respect of lead silicofluoride and 1.2-molar in respect of lead methane sulfonate. Moreover, there is an excess, e.g., 0.8-molar, of the corresponding acids.

The following test results have been obtained:

By charging with 4.5 A the battery takes up 6.2 Ah. By discharging with 3.15 A it delivers 5.9 Ah in the course of 110 minutes, while at the same time the pole voltage drops from 12.6 V to 9.8 V. The average voltage during discharge is 12.0 V and the specific energy content is 52 Wh/kg.

EXAMPLE 5

Figure 4:
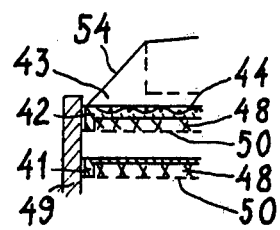
FIG. 4 shows on a larger scale a vertical part section through the battery of FIG. 3.
Figure 3:
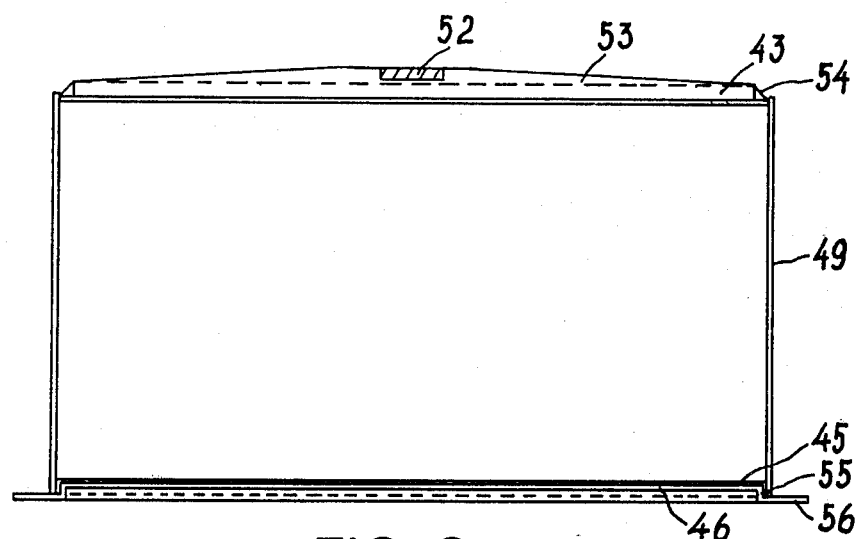
FIG. 3 is a side view of a sixty-cell battery representing a fourth example.
Figure 5:
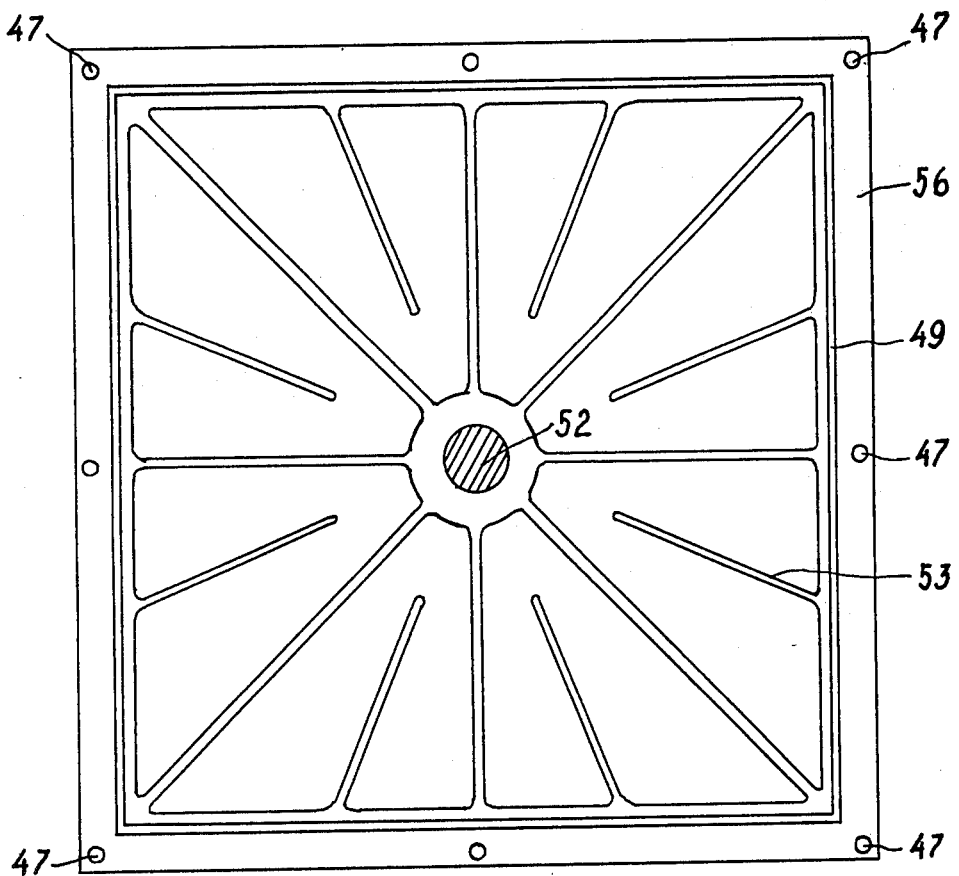
FIG. 5 is a top view of the battery of FIG. 3.

Sixty-cell battery, FIGS. 3, 4 and 5.

Fifty-nine identical caps 41 are made by moulding under heat and pressure from 11 parts by weight of polystyrene and 10 parts by weight of crushed graphite fibers. The caps have a thickness of 0.5 mm, are square with a side length of 550 mm and are constructed with a protruding collar portion. A top cap 42 is made from the same polystyrene/graphite fiber mixture and has a thickness of 1.5 mm. Moreover, an aluminum top cover 43 is made by injection moulding in the form of a square plate which on its upper side is constructed with reinforcement ribs 53 and an upwardly extending edge 54. A circular plug 52 of steel is pressed into a hole of the top cover 43 by crimping. The plug 52 is tin-plated on its top face. It serves for the connection of an outer supply conductor by means of a magnet. The aluminum top cover 43 is tin-plated on its underside, and a tin-plated steel wire net 44 is attached thereto by a multitude of spot solderings. The aluminum top cover is pressed into the top cap 42 with application of heat.

A bottom cap 45 having a thickness of 1.5 mm is made from the same polystyrene/graphite fiber mixture. A bottom cover 46 consisting of a steel plate, which is provided with a collar 55 and a flange 56, fits in the bottom cap. The flange 56 extends beyond the contour of the bottom cap and is provided with holes 47 for the electrically conducting fastening of the battery. The steel plate is tin-plated on its upper face and a tin-plated steel wire net is attached thereto by a multitude of spot solderings. The bottom cover 46 is pressed into the bottom cap 45 with the application of heat. An anode body 48 having a thickness of 3.6 mm and consisting of a graphite material with graphite fibers in textile structure and having a pore volume of 85% is welded into each of the fiftynine caps 41 by means of chloroform vapour. The caps are introduced into a square polyvinylchloride tube 49 and glued thereto in the following succession counted from the bottom: 45, 41, ..., 41, 42. Immediately below each anode body 48 a piece of liquid-permeable polypropylene paper 50 is mounted at a distance of 3.3 mm from the cap 45, 41, ..., 41 next below by means of small spacing rings (not shown) distributed over the cross-sectional area and having a height of 3.3 mm.

The electrolyte is injected through a hole bored for each cell in the wall of the tube 49, whereafter the holes are closed by means of silicon rubber stoppers. The electrolyte is an aqueous solution which is 2-molar in respect of lead silicofluoride and 1-molar in respect of lead methane sulfonate. Moreover, there is an excess of the corresponding acids corresponding to, e.g., 0.8-molar.

The term "artificial resins" as used in the description and claims of this application should be interpreted in its broadest sense, i.e., as generally synonymous with "plastics materials" (in German "Kunststoffe").

I claim:

1. Lead salt electric storage battery with electrodes of first order, having an active anode body comprising graphite, characterized by the combination of the following features:
   (a) the active anode body consists of graphite fibers in textile structure,
   (b) the active anode body is connected with an electrolyte-impervious, electrically conductive cell closure consisting of moulded articifial resin with moulded-in, uniformly distributed short graphite fibers,
   (c) the connection between the active anode body and the cell closure is established through a uniting interface layer consisting of artificial resin with graphite fibers embedded therein,
   (d) the electrolyte consists of a mixture of lead silicofluoride ($PbSiF_6$) and lead methane sulfonate ($Pb(CH_3SO_3)_2$) dissolved in water the proportion of lead silicofluoride ranging from 100 to 0%,
   (e) the graphite fibers mentioned in paragraphs (a), (b) and (c), which have not been graphitized at a temperature of at least 2500° C., and the artificial resin materials with moulded-in short graphite fibers are such as are capable of withstanding a gas development test consisting of immersing a sample of the respective materials and a strip of lead in an acid aqueous solution of lead silicofluoride, connecting the sample to the positive terminal and the strip of lead to the negative terminal of a source of electric current, awaiting the deposition of a thin layer on the sample, inserting the sample thus prepared into a test tube from polystyrene filled with the same liquid as above, hermetically closing the test tube and storing it in inverted position, and watching that no trace of gas development takes place in said test tube within an observation interval up to four weeks.

2. Lead salt electric storage battery as in claim 1, wherein the graphite fibers have a solid matter density higher than 1.8 g/cm$^3$.

3. Lead salt electric storage battery as in claim 1 or 2, wherein the graphite fibers are of the pitch-based type.

4. Lead salt electric battery as in claim 1, wherein the cell or each cell of the battery is permanently hermetically closed and is disposed with the electrodes in horizontal position and with the anode at the top.

5. Lead salt electric battery as in claim 1, wherein the electrolyte is an aqueous solution which is about 1.8-molar in respect to $PbSiF_6$ and about 1.2-molar in respect of $Pb(CH_3SO_3)_2$.

6. Lead salt electric battery as in claim 5, wherein the electrolyte contains an excess, such as 0.8-molar, of the corresponding acids.

7. Lead salt electric storage battery as in claim 1, wherein the cathode consists of the same material as the cell closure.

8. Lead salt electric storage battery as in claim 7, wherein the side of the cathode facing the electrolyte is provided with a thin layer of graphite spray followed by a light polishing.

9. Lead salt electric storage battery as in claim 1, wherein the connection between the active anode body and the cell closure is established by gluing with an artificial resin glue with mixed-in short graphite fibers.

10. Lead salt electric storage battery as in claim 1, wherein the connection between the active anode body and the cell closure is established by embedding fibers at the surface of the active anode body in the artificial resin of the cell closure by temporary softening of the surface of said artificial resin by heat.

11. Lead salt electric storage battery in claim 1, wherein the connection between the active anode body and the cell closure is established by embedding fibers at the surface of the active anode body in the artificial resin of the cell closure by temporary softening of the surface of said artificial resin by the application of a volatile solvent.

* * * * *